No. 685,330. Patented Oct. 29, 1901.
H. J. HENRICHSON.
COMPUTING SCALE.
(Application filed June 17, 1901.)
(No Model.)
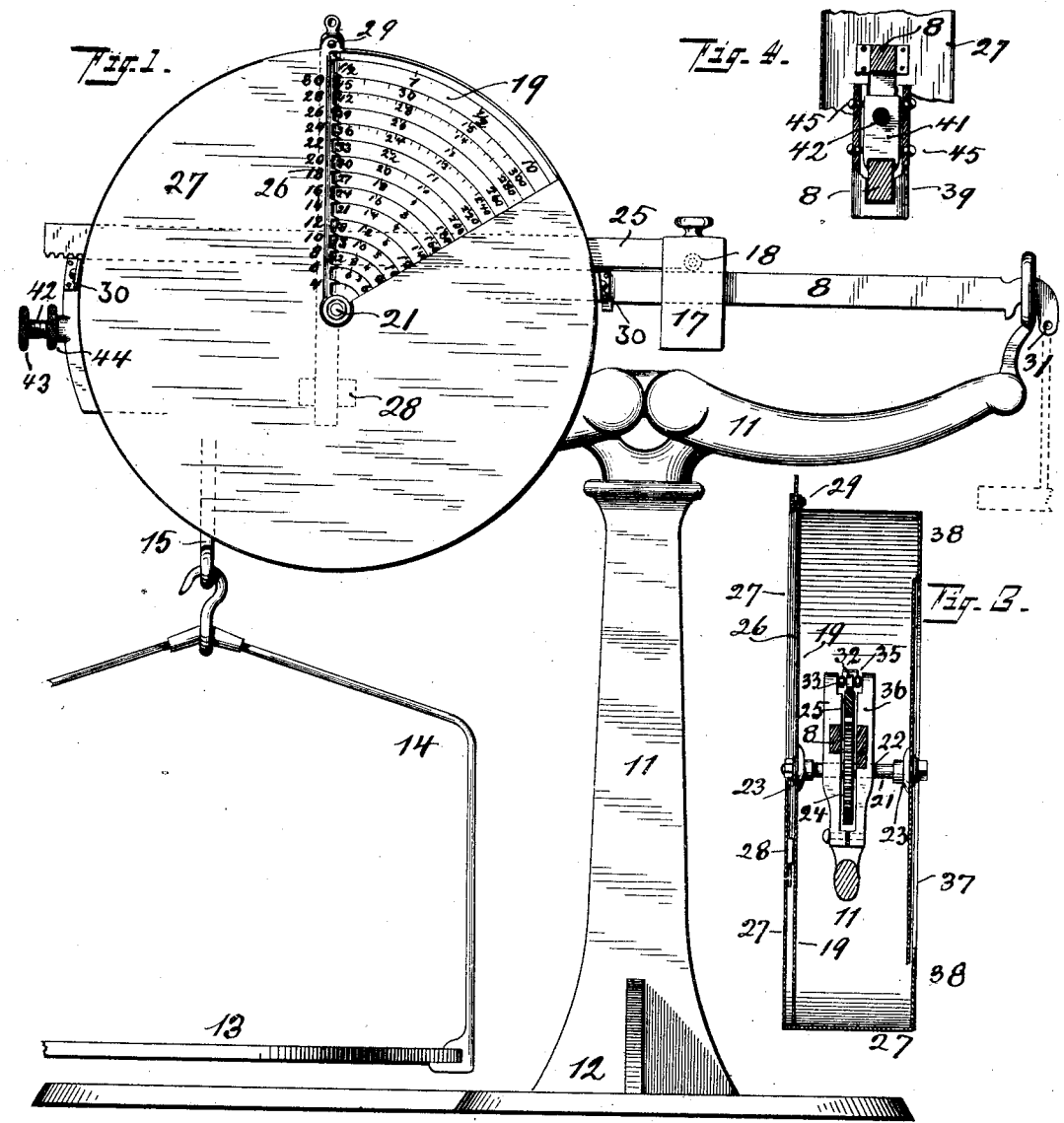
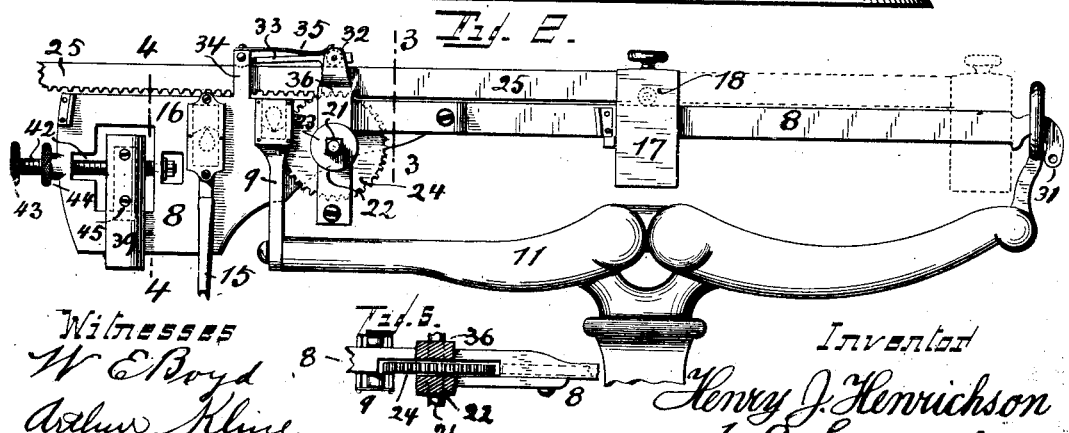
Witnesses
W. E. Boyd
Arthur Kline
Inventor
Henry J. Henrichson
by C. Spengel atty

UNITED STATES PATENT OFFICE.

HENRY J. HENRICHSON, OF CINCINNATI, OHIO.

COMPUTING-SCALE.

SPECIFICATION forming part of Letters Patent No. 685,330, dated October 29, 1901.

Application filed June 17, 1901. Serial No. 64,810. (No model.)

*To all whom it may concern:*

Be it known that I, HENRY J. HENRICHSON, a citizen of the United States, and a resident of Cincinnati, Hamilton county, State of Ohio, have invented certain new and useful Improvements in Computing Attachments for Multiplying Beam-Scales; and I do declare that the following is a description of the invention sufficiently clear, full, and exact to enable others skilled in the art to which it appertains to make and use the same, attention being called to the accompanying drawings, with the reference-numerals marked thereon, which form a part of this specification.

This invention relates to certain improvements in beam-scales provided with a sliding weight or poise and with an attachment which shows at the same time with the weight of an apportioned quantity of a certain article also the price of the quantity so weighed.

It relates more particularly to such scales where these two results are had by obtaining one of them directly, which may be either one; after which the other appears automatically and as a necessary consequence—that is to say, a scale as here outlined weighs either by weight or by money value to suit the particular form in which the demand is made for the sale of the goods. For instance, if one pound is wanted the poise is set to balance one pound, the attachment showing at the same time the price of it. If ten cents' worth is wanted, the poise is set to weigh ten cents' worth, the construction being such that the scale balances only at the correct weight to be given; but such weight need not be considered in the transaction. The setting of the scale is done in each case by moving the poise and adjusting its position in conjunction with graduated scales, the one used in the first case showing weights and the one used in the second case showing money values, the two showings being dependent, however, on each other and appear always simultaneously.

My invention consists of the provision of the particular means whereby these results are obtained and of their construction in general and in detail.

In the following specification, and particularly pointed out in the claims at the end thereof, is found a full description of the invention, together with its manner of operation, parts, and construction, which latter is also illustrated in the accompanying drawings, in which—

Figure 1 shows an elevation of a scale provided with the improvements contemplated by my invention. Fig. 2 shows an elevation of the upper parts of this scale, being particularly the scale-beam and adjacent parts, but with the indicating device removed. Fig. 3 is a vertical cross-section of Fig. 1, the plan of section being indicated on the scale-beam by line 3 3 in Fig. 2. Fig. 4 is a similar section on line 4 4 of the same figure. Fig. 5 is a top view of a part of the scale-beam near its pivot.

In the drawings, 8 indicates the beam of a multiplying-scale, which is pivotally supported on a post 9 at the upper part of a suitable frame 11, resting on a base 12. The platform or scale-pan 13 is provided with a frame 14 and by means of a link 15 supported in the usual manner at 16 on the short arm of the scale-beam.

17 is the sliding weight or "poise," as it is usually called, mounted on the scale-beam, on which it is lengthwise adjustable in the well-known way, a roller 18 being preferably interposed to reduce friction.

For purposes of showing weights or money values, or preferably both at the same time, I provide a disk 19, rigidly mounted on a shaft 21, supported in bearings 22, which form a part of the scale-beam, being simply downward-extending projections thereof, or are attached thereto in a suitable manner. The attachment of the disk may be by an intervenient flange 23 on shaft 21. There is, further, mounted on shaft 21 between its bearings, also rigidly connected, a gear-wheel 24, the construction and arrangement being such that whenever this latter rotates the disk rotates also. It is to be noted that these parts are supported below the scale-beam to prevent shifting of the center of gravity of the former during its oscillations out of a position horizontally in line with its pivotal support, which is absolutely necessary to the accurate operation of a scale. For purposes of rotating the gear-wheel I provide a rack 25 in mesh therewith and attached with one end to poise 17, so that wherever this latter moves the rack must go necessarily with it, and by reason of its operative connection with gear-wheel 24 rotation of the latter follows as a necessary consequence. As will be seen, this rack is arranged above the scale-beam; but to avoid all friction and wear it does not come in contact with this latter, being supported only at the poise and resting on the gear-wheel. By reason of its connection it is clear that this rack by its weight influences the scale-beam, and therefore has to be taken into consideration when arranging the size of the weight or poise. In other words, it forms part of this latter—that is to say, the two together constitute the poise. In this case the combined weight is assumed to be two pounds, the capacity of the scale being ten pounds, with a proportion of one to five between weight and divisional arrangement and location of support of the scale-beam. By reason of the described construction and operative connection of the parts it is clear that any longitudinal movement of the poise on the scale-beam causes a rotary movement of disk 19, which two movements have a certain proportional relation to each other, which when aided by certain graduations is utilized to obtain the desired results contemplated by my invention.

An arrangement most convenient for all purposes is such that a shift of the poise through the entire length of its possible movement causes a complete rotation of disk 19. The further arrangement is now one simply of division and graduation, there being graduated and subdivided circular lines on disk 19 giving money values and operating in conjunction with a stationary scale 26, which shows prices per pound. This latter scale may form part of or be attached to the front side of a housing 27, inclosing the disk and other operating parts. This housing is attached to and supported on the scale-beam by any suitable means—as, for instance, by lugs 30, as shown in the drawings—and provided with openings to permit passage of the rack and also to expose part of the disk to show figures. This stationary scale is of an independent piece, slightly adjustable in a radial direction with reference to the disk, so that during manufacture of the scale it may be accurately placed to correspond with the circular scales on the disk. For such purpose one of its ends is held in position by a guide 28, within which it is free to slide. Its other end is held by a screw 29, passing through a slot in it and seated in the housing. After adjustment this screw is screwed home to tightly clamp the scale, thereby holding it in place. For every mark on this scale giving a price per pound there is a corresponding circular line on the disk, divided first into ten parts, because from one to ten pounds may be weighed and sold on this scale, each of such parts indicating the money value of one pound at the particular price. Each of these parts may again be subdivided to suit fractional parts to be sold, which parts may be sold as fractions of weight or as fractions of the price per pound. By preference I also provide one circle the figures of which show weights exclusively, although all the other circles show weights also, but indirectly and only through the medium of figures intended to show computed money values. The operation of my scale may now be readily understood. Supposing one and one-half pounds is wanted of an article costing eighteen cents per pound. The scale is set by moving the poise, the latter's position being ascertained by watching disk 19. This may be seen on this latter in two places, first by observing the outer circle until a point on it half-way between the marks "1" and "2" is in line with the price-scale. The price may now be ascertained by observing the number on the disk which is opposite figure "18" on the price-scale, which shows the price to be twenty-seven cents. Or the particular weight may be left entirely out of consideration when the demand for the sale is made in money value and in which case the figures indicating money value are only observed. Thus, for instance, if fifteen cents' worth is wanted of an article costing ten cents a pound the user simply watches the figures on the disk appearing opposite the figure "10" on the price-scale, and the poise is moved until the disk shows "15 cents," which movement sets the scale to balance a quantity of the particular article to the value of fifteen cents.

The capacity of the scale may be increased by using additional weights, the same as is customary in scales, and which extra weights are suspended at 31.

The rack is held down in contact with the gear-wheel by suitable means, preventing displacement upwardly, which means are provided by preference with an intervenient roller 32 to reduce friction. I further prefer to support the roller in a manner whereby it is held down against the rack with a yielding or spring pressure instead of positive means, thereby preventing friction and binding. For such purpose roller 32 is mounted between a forked bearing at the free end of a link 33, the other end of which is pivotally attached to posts 34, projecting upwardly from the scale-beam.

35 is a spring bearing down at the free end of link 33, where the roller is supported. Roller 32 is confined in position against lateral displacement by additional posts 36, also projecting upwardly from the scale-beam and which may form in this case upward extensions of the posts which form the bearings 22 for cog-wheel 24. These same or posts 34 may also form guides to keep the rack moving between them in position against lateral displacement. Shaft 21 projects on each side beyond its bearing, and disk 19 may be attached at either end to suit either a right-handed (as shown) or a left-handed user, the disk being attached to the end nearest him. This prevents the customer, standing usually on the other side, from seeing what is indicated by the disk; but this in most cases is not necessary. Should such be required, however, then a similar disk may also be mounted on the other end; or, as shown in Fig. 3, I mount a disk 37 somewhat smaller in size on this reverse end, the same to indicate pounds only, which it does in conjunction with a stationary mark on the flat side 38 of the housing. The central part of this latter is entirely left open on this side. In place of this latter disk there might also a hand be used.

41 is the weight for adjusting the correct balance of the scale and center of gravity of its beam, being carried so as to have a longitudinal adjustment on a screw 42, which is mounted in a longitudinally-fixed position in bearings at the short end of the scale-beam. This screw is operated by a knob 43 and held in position after adjustment of the balance of the scale by a lock-nut 44. There must also be means to adjust the center of gravity of the scale-beam vertically in order to maintain such center horizontally in line with its pivot. For such purpose weight 41 is arranged to be also vertically adjustable, which is accomplished by having it in two parts, the additional part 39 being attached thereto by means of a screw connection. For such purpose I use, preferably, two screws 45, passing through the upper part of weight 39 and bearing against part 41 between them, thereby holding the former to the latter by the pressure of their contact. When adjustment becomes necessary, these screws 45 are loosened, and after part 39 of the weight is vertically adjusted on the other part 41 by being moved up or down thereon they are tightened again. This particular manipulation for purpose of adjusting the center of gravity is not intended to be performed, however, by the user of the scale. The lower part of weight 39 embraces adjacent parts of the scale-beam, thereby preventing rotation of the adjusting-weight when screw 42 is rotated for horizontal adjustment.

It will be seen that by reason of the particular operative connection used between the poise and the disk any movement of this former is at once positively and to a corresponding extent transmitted to this latter.

Having described my invention, I claim as new—

1. In a multiplying beam-scale, the combination with the scale-beam thereof having bearings 22 projecting downwardly therefrom, of a shaft supported in them and below the scale-beam, a cog-wheel mounted on this shaft, a sliding weight adjustably supported on the scale-beam, a rack in mesh with the cog-wheel and supported by this latter and by the sliding weight to which it is connected in a manner to share in its movements, a friction-roller bearing against the upper edge of the rack to hold the same in contact with the cog-wheel, a graduated disk also mounted on this shaft so as to rotate when the cog-wheel is rotated and a graduated stationary scale operating in conjunction with the graduated disk.

2. In a multiplying beam-scale, the combination with the scale-beam thereof having bearings 22 projecting downwardly therefrom, of a shaft supported in them and below the scale-beam, a cog-wheel mounted on this shaft, a sliding weight adjustably supported on the scale-beam, a rack in mesh with the cog-wheel and supported by this latter and by the sliding weight to which it is connected in a manner to share in its movements, posts 34 projecting upwardly from the scale-beam serving as guides for the rack which moves between them, a link 33 pivotally connected to these posts, a friction-roller carried at the free end of the link and resting on the upper edge of the rack, a spring 35 bearing against link 33 to hold the same with the roller down against the rack, a graduated disk also mounted on this shaft so as to rotate when the cog-wheel is rotated and a graduated stationary scale operating in conjunction with the graduated disk.

3. In a computing-scale, the combination with the scale-beam thereof, of a disk supported thereon in a manner to be free to rotate, graduations thereon, arranged in circular lines, a housing attached to the scale-beam inclosing this disk, part of it being cut out to render the graduations visible, a graduated scale 26 to coact with the graduated disk, the same secured at both of its ends to the housing and at one of the edges of the opening therein, which edge is arranged radially with reference to the disk, the connection of this scale 26 being such as to render it adjustable with reference to the circular graduation of the graduated disk and in a radial direction thereto, a sliding weight on the scale-beam and operative connection between it and the rotary disk whereby movement of the weight causes a corresponding rotation of the disk.

In testimony whereof I hereunto set my hand in the presence of two witnesses.

HENRY J. HENRICHSON.

Witnesses:
C. SPENGEL,
ARTHUR KLINE.